March 7, 1967  R. W. ERIKSON  3,307,569
RELIEF AND BY-PASS VALVE FOR FUEL BURNERS
Filed Jan. 6, 1964  2 Sheets-Sheet 1
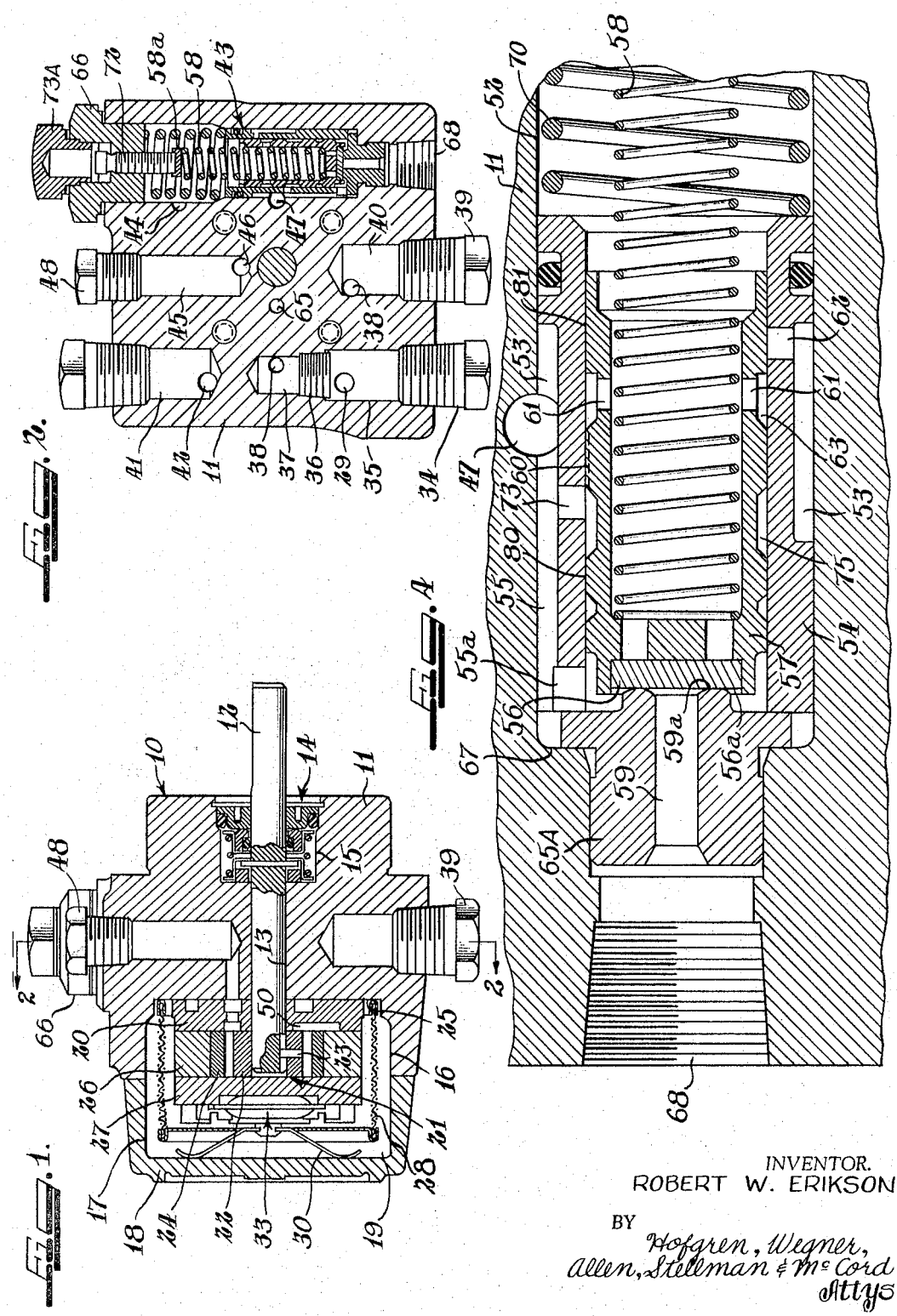
INVENTOR.
ROBERT W. ERIKSON
BY
Hofgren, Wegner,
Allen, Stellman & McCord
Attys.

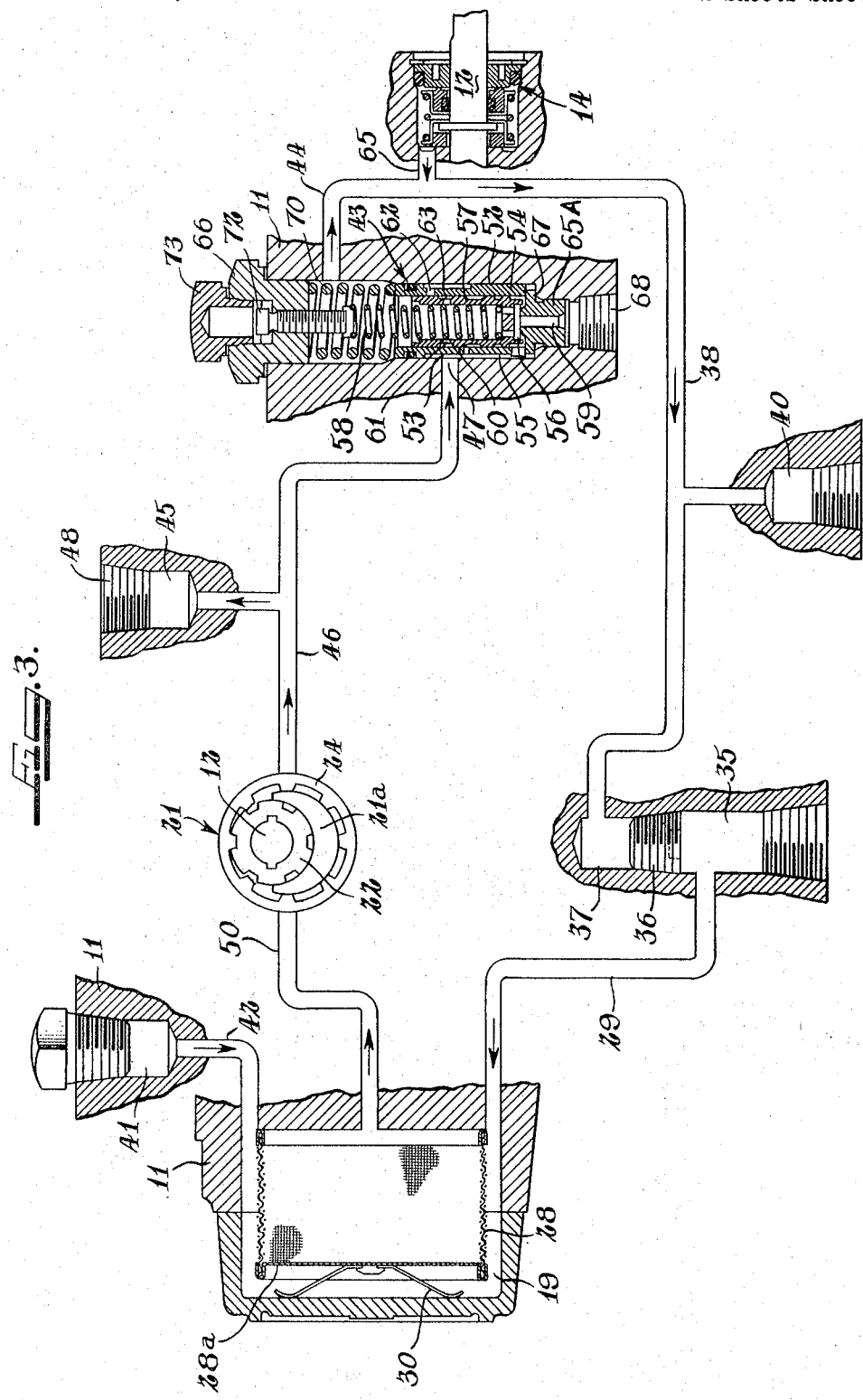

United States Patent Office 3,307,569
Patented Mar. 7, 1967

3,307,569
RELIEF AND BY-PASS VALVE FOR FUEL BURNERS
Robert W. Erikson, Rockford, Ill., assignor to Sunstrand Corporation, a corporation of Illinois
Filed Jan. 6, 1964, Ser. No. 335,825
4 Claims. (Cl. 137—116)

This invention relates to fuel pump units for oil burners and the like.

In fuel burning systems it is desirable to deliver fuel to the fuel nozzles free of any entrained air. The fuel delivering apparatus should accomplish this by removing air from the fuel before it reaches the nozzle, and this may be done by spinning the fuel in an annular centrifuge chamber of a valve unit so that the more dense fluid without entrained air flows to the outside of the chamber where it is drawn off and delivered to the nozzle through a pressure responsive valve. In a preferred construction, an annular groove on the movable valve member communicates with the annular chamber when the valve opens a predetermined amount so that the greater portion of the fluid delivered to the valve unit, including fluid with entrained air, is exhausted to the tank or returned to the pump. An annular recess is also formed in the movable valve member in constant communication with the annular chamber and continuously bleeds off a portion of the fluid delivered to the valve even when the valve is closed to remove entrained air and provide improved valve operation. Because of the pressures involved in this type of apparatus and because of the various valve ports, leakage in the valve may cause difficulties in the control of the fluid flow and pressure under some circumstances.

It is a primary object of the present invention to provide a new and improved oil burner pump unit with reduced leakage, facilitating better pressure regulation.

A more specific object of this invention is to provide a new and improved unit of the type described including a pump and a valve for delivering fuel oil to an oil burner in which the valve is constructed to have a minimum of leakage.

A further object of the present invention is to provide a new and improved control valve for a unit of the type described in which fluid flows from one inlet port to several outlet ports arranged so that leakage between the ports is minimized.

Another object of this invention is to provide a new and improved valve constructed to reduce accumulation of foreign matter on the valve lands.

Other and further objects of the invention will be readily apparent from the following description and drawings, in which:

FIGURE 1 is a longitudinal sectional view through a pump unit embodying the principles of the present invention;

FIGURE 2 is a cross section taken along line 2—2 of FIGURE 1 showing the pressure regulating and shut-off valve and housing passages;

FIGURE 3 is a partially schematic view of the fuel delivery system; and

FIGURE 4 is an enlarged fragmentary view of the valve.

While this invention is susceptible of embodiments in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring to FIGURE 1, the fuel delivery unit, generally designated by the numeral 10, is mounted in a housing 11. A pump drive shaft 12 is rotatably mounted in a bore 13 within housing 11, and sealed at one end by a seal unit 14 mounted within a counterbore 15 in the housing 11, as shown and described in applicant's U.S. Patent No. 3,069,177. An opening 16 in the housing 11 mates with a recess 17 in an end cap 18 which is bolted to the housing 11. Opening 16 and recess 17 together form a reservoir 19 within the housing. A port plate 20 is mounted on drive shaft 12 and is fixed with respect to the end surface 25 of the reservoir. A gear pump 21 consists of an inner pinion-like gear 22 fixed on shaft 12 as by drive key 23, a larger outer ring gear 24 mounted eccentrically with respect to shaft 12 in a plate 26, and a crescent-shaped member 21a in the space between gears 22 and 24. As shaft 12 rotates, inner gear 22 drives the eccentrically mounted gear 24 and compresses fluid delivered thereto. A pump cover plate 27 is mounted upon the gear plate 26, and the plates 26 and 27 form a non-rotating unit with the port plate 20. A cylindrical sleeve-like screen 28 surrounds the gear pump and filters fuel received from inlet port 29 (FIGURE 2). One end of the screen 28 is closed by a plate 28a and a leaf spring 30 on plate 28a urges the opposite end of the screen against the surface 25 of the reservoir 19. Seated on plate 27 between it and plate 28a is an anti-hum and vibration damping diaphragm capsule 33 which is similar to that shown and described in U.S. Patent No. 2,803,196.

Viewing FIGURE 2, fluid is delivered to the housing 11 when inlet plug 34 is removed, through threaded bore 35, and passes through passage 29 to the reservoir 19 outside screen 28 before entering the pump 21. A return plug 36 is threaded within a bore 37 which communicates with the low pressure return passage 38 and bore 35, and may be removed to permit return of excess fluid to the reservoir if desired. Tank plug 39 threaded within a bore 40 in housing 11 also communicates with the low pressure passage 38 and permits fluid returned from the control valve to be discharged back to the tank, if desired, in lieu of return to the reservoir 19. An additional inlet port 41 communicates with passage 42 which opens to the outside of the screen 28 in reservoir 19 and may be used in lieu of the inlet bore 35 as, for example, when fuel is supplied by gravity to reservoir 19. Excess fluid from the valve 43 is expelled to port 44 which communicates with the low pressure return passage 38. Fluid delivered to the valve from the gear pump is delivered through the port plate 20 to a high pressure passage 46 which opens to a valve inlet port 47 and to a gauge bore 45 which is adapted to receive a pressure gauge when a plug 48 is removed.

Referring now to FIGURE 3, it should be noted that all the components shown in schematic form are enclosed within the housing 11 in the present embodiment. With the plug 34 removed from bore 35, a fuel supply source is connected to the bore 35. As the shaft 12 (FIGURE 1) rotates, gear pump 21 draws fuel from a supply tank to the reservoir, through the filter screen 28, and from the reservoir through a pump inlet passage 50 in port plate 20, and into the gear pump 21. Compressed fuel is expelled from the gear pump 21 through the port plate 20 and into the high pressure passage 46. Since the gauge port 45 communicates with the high pressure passage 46, a pressure gauge mounted within the bore 47 will indicate the outlet pump pressure. The high pressure fuel is delivered to the pressure regulating and shut-off valve 43 through valve inlet port 47.

Since the port 47 is tangentially disposed with respect to valve bore 52, high pressure fluid entering an annular valve inlet manifold chamber 53 in the valve bore, between the bore wall and a valve sleeve 54, follows a circular path therein and the denser air free fuel remains adjacent the bore wall while the less dense fuel moves toward the center of the bore. The denser fuel travels slowly down axial passages 55 and through radial ports 55a in sleeve 54, while any bubbles therein rise, and urges hollow cylindrical valve member 57 upwardly against the downward force of spring 58 to lift cylindrical valve closure member 56 off of annular valve seat 59a around outlet port 59. When the pressure of the fuel against member 56 is sufficient to raise the valve member 57, fuel will be admitted to the nozzle exhaust or primary passage 59 which communicates with nozzle port 68.

Fuel is continuously bled from the annular chamber 53 through sleeve port 73, restricted passages 60 in valve member 57, radial valve member ports 61, and the spring chamber in bore 52 which communicates with the low pressure return line 38. A major portion of the fuel supply to the valve is drawn off, after the valve opens, through radial port 62 in valve sleeve or support 54, into annular groove 63 in valve member 57, through radial relief port 61 therein, and from there to the low pressure passage 38. Leakage fluid along the shaft 12 in bore 13 to the shaft seal 14 is returned from the seal to the low pressure passage 38 through a passage 65 (FIGURE 2).

In operation, tank plug 39 may be removed so that the fuel returning in the low pressure passage will be entirely discharged to the tank. In this case, sufficient fuel must be supplied to the system through inlet bore 35, to meet the entire requirements of the system. Alternatively, tank plug 39 may be threaded into bore 40 so that no fuel will return therethrough to the tank. In this case, the low pressure returning fuel is delivered to bore 37, which communicates with bore 35 when plug 36 is removed, and then to the reservoir 19. The system is typically arranged so that the pump delivers approximately 15 gallons per hour. Of the amount delivered by the pump, about one gallon per hour is usually delivered to the nozzle port 68 by pressure regulating shut-off valve 43 at about 100 p.s.i., and the remaining major portion is returned through the radial port 62 and restricted passages 60. Therefore, if tank plug 39 is installed, it is only necessary to supply approximately one gallon per hour to the inlet bore 35 from the tank source. It should be understood that when the entire low pressure fuel is exhausted to the tank to bore 40, that the plug 36 would be installed, thereby preventing any return flow of fuel to the inlet. With the tank plug 39 withdrawn and plug 36 installed, it is necessary to supply about 15 gallons per hour to the inlet bore 35 from the outside fuel source. The excess fluid pumped over and above the requirements at the nozzle is important in providing air free oil at the nozzle and in providing rapid valve closure on shutting down the system.

Referring now to FIGURES 3 and 4 for a detailed description of the shut-off valve 43, a flanged valve seat member 65A is mounted upon a shoulder 67 within bore 52. Bore 68 in housing 11 is threaded to receive a line leading to the fuel nozzles in the fuel burner (not shown). The valve support or sleeve 54 is urged against the valve seat 65A by the spring 70. Spring 70 is held in position by a plug 66 threaded into the upper end of bore 52, and functions after assembly to hold the valve sleeve seated against member 65A.

Valve member 57 is resiliently urged into contact with the valve seat 59a by the spring 58 bearing against spring seat 58a which may be adjusted by set screw 72 threaded into plug 66. A protective cap 73A threaded into plug 66 prevents the inadvertent adjustment of screw 72.

Referring to FIGURE 4, radial ports 73 in valve sleeve 54 connect the annular valve inlet chamber 53 to the inner surface of the valve sleeve, and communicate with an outer annular groove 75 on the cylindrical valve member 57. It should be noted that the recess 75 is of sufficient length so that the port 73 will remain in communication therewith even though the valve member 57 is moved away from the valve seat 65A by the force of the fuel acting against valve closure surface 56a of the valve member. Restricted axial passages 60 connect the annular recess 75 with annular groove 63, thereby permitting a limited amount of fuel to be bled from the annual chamber 53 to the secondary radial exhaust port 61. It should be noted that the annular groove 63 is further from the surface 56 of the valve member than the annular recess 75.

In operation, as fuel enters the tangential inlet passage 47 it spins around in the annular chamber 53, as described above. Immediately upon the admission of fuel to annular chamber 53, even though the valve is closed, a small amount of fuel is bled through the restricted passage 60, through radial port 61 to the low pressure passage 38. One of the purposes of the bleeding passages is to assure that fuel with air entrained may be expelled from the system even though the valve is not open a sufficient distance to permit discharge of fuel through the radial port 62. When the fuel pressure rises sufficiently, the force thereof acting on the surface 56a of valve member 57 urges the valve open against the force of spring 58, thereby permitting fluid to escape to the nozzle through the primary exhaust passage 59. As the valve member 57 opens, the annular groove 63 communicates with the radial port 62, thereby permitting the major portion of the fluid in chamber 53 to flow through radial port 61 to the low pressure passage 38. As the fuel pressure in annular chamber 53 increases, the valve member 57 will move further to the right, as viewed in FIGURE 4, thereby increasing the opening to annular groove 63 through radial port 62 and increasing the flow of excess fluid therethrough to the low pressure passage 38. This serves to reduce the fluid pressure on the surface 56 and thereby balances the valve in a predetermined open position to deliver fluid at the required pressure.

It should be noted that there is no tendency for the fluid acting against the valve surface 56a to leak along the mating surfaces 80 of the bore of valve member 57 and sleeve 54 into the annular recess 75 because the pressure is equal at the recess and at the surface 56. Also, there is no tendency for fuel to escape along the mating surfaces 81 from the groove 63 to the right end of the valve because both are at low discharge passage pressure. The only significant pressure differential occurs across the land between grooves 75 and 63, and since bleed passages 60 extend across the land, any leakage across the land is insignificant to pressure regulation. Since leakage in the valve has been reduced to a minimum, it is possible to more accurately regulate the flow of fluid therethrough. Further, since leakage on the valve lands has been minimized, this structure results in a reduction of accumulation of dirt on the valve lands. Since a major portion of the fluid delivered to the valve is not delivered to the nozzle, it is readily apparent that any reduction of fuel pressure in the inlet chamber 53 will result in the immediate closing of the valve. As one motor usually drives the pump and the burner blower, prompt valve closure prevents the pump unit from delivering fuel to the oil burner after the blower has been shut off on burner shutdown, thereby preventing smoking in the burner.

I claim:

1. In a valve apparatus for controlling the flow of fluid fuel from a fuel pump to a fuel burner, a valve housing having means providing a valve bore, a valve member slidable in the valve bore, a burner port adjacent one end of the valve bore for delivering pressurized fluid, a return port adjacent the other end of the bore for delivering relieved fluid at low pressure, a valving surface on said valve member adjacent one end thereof movable relative to said burner port for controlling the flow of fluid therethrough, a valve inlet manifold in the housing adapted to receive fluid under pressure from a pump, a passage in the housing connecting said inlet manifold with said one end of the bore for supplying fluid to said burner port upon valve opening movement of the valve member, a relief passage leading from the inlet manifold to the valve bore, a first external recess on the valve member continuously communicating with said return port adapted upon predetermined valve opening movement to connect the relief passage and the return port, a second external recess on the valve member intermediate said valving surface and said first external recess, passage means in the housing constantly communicating the inlet manifold and said second external recess to minimize leakage of fluid along the valve member between the burner valving surface and the second external recess, restricted passage means in said valve member between said first and second external recesses for continuously bleeding a portion of the fluid in the inlet manifold to the return port, and means for moving the valve member.

2. In a valve apparatus for controlling the flow of fluid fuel from a fuel pump to a fuel burner, a valve body having a bore therein, a valve sleeve stationarily positioned in the bore, an annular valve seat at one end of the valve bore having a high pressure burner outlet port therethrough, a return port leading from the valve bore adjacent the other end thereof, a hollow cylindrical valve member slidable in the valve sleeve, closed at one end and having a valve surface adapted to engage said annular valve seat, an outer annular groove on the valve sleeve providing a valve inlet manifold, a passage leading from one end of the manifold to said one end of the bore for delivering fluid under pressure to said one end of the valve member to move the latter to valve open position, spring means acting against the closed end of the valve member urging the latter toward valve closed position, a relief passage through the valve sleeve adjacent the other end of the inlet manifold, a relief port through the valve member continuously communicating with said return port adapted to communicate with said relief passage upon predetermined valve opening movement, an external annular groove on the valve member intermediate the relief port and the burner port, a port through the valve sleeve constantly communicating the inlet manifold and the groove so that high pressure fluid in the latter prevents leakage of fluid along the length of the valve member between the groove and the burner port, and restricted passage means in said valve member between said groove and said relief port for continuously bleeding a portion of the fluid in said inlet manifold to said return port, whereby leakage along the valve member between the relief port and the open end thereof is minimized.

3. In a valve apparatus for controlling the flow of fluid fuel from a fuel pump to a fuel burner, a valve body having a bore therein, a valve sleeve stationarily positioned in the bore, an annular valve seat at one end of the valve bore having a high pressure burner outlet port therethrough, a return port leading from the valve bore adjacent the other end thereof, a hollow cylindrical valve member slidable in the valve sleeve, closed at one end and having a valve surface adapted to engage said annular valve seat, an outer annular groove on the valve sleeve providing a valve inlet manifold, a passage leading from one end of the manifold to said one end of the bore for delivering fluid under pressure to said one end of the valve member to move the latter to valve open position, spring means acting against the closed end of the valve member urging the latter toward valve closed position, a relief passage through the valve sleeve adjacent the other end of the inlet manifold, a first annular groove on the valve member adapted to communicate with said relief passage upon predetermined valve opening movement, a relief port through the valve member at the first annular groove continuously communicating with said return port, a second annular groove on the valve member intermediate the first groove and the burner port, a port through the valve sleeve constantly communicating the inlet manifold and the second valve member groove so that high pressure fluid in the latter prevents leakage of fluid along the length of the valve member between the second groove and the burner port, and restricted passage means in said valve member between said first and second annular grooves for continuously bleeding a portion of the fluid in the inlet manifold to the return port, whereby leakage is minimized along the valve member between the first groove thereon and the open end thereof.

4. A valve for delivering fluid to a fuel nozzle comprising a valve support, an annular inlet chamber in said valve support for supplying fluid to said valve, a fixed valve seat at one end of said valve support having a primary outlet passage therein adapted to be connected to a fuel nozzle, a hollow cylindrical valve member slidably mounted in said valve support having a surface at one end thereof for engaging said seat and closing said primary outlet passage, return port means continuously communicating with the interior of and the other end of said valve member, resilient means for urging said valve member toward said seat, a flow passage in said valve support communicating with said inlet chamber and said surface, a first radial port in said valve support connecting said inlet chamber and the outer surface of said valve member, an annular recess in said valve member communicating with said first radial port in both the open and closed positions of said valve member, a second radial port in said valve support spaced further from said one end than said first radial port, means connecting said second radial port to said inlet chamber, an annular groove in said valve member spaced from said second radial port when said valve member is closed, said groove communicating with said second port when said valve member is open, port means in said valve member connected to said groove and continuously communicating with said return port means to permit a major portion of the inlet fuel to bypass the primary outlet passage, and restricted passage means in said valve member connecting said recess and said groove.

References Cited by the Examiner
UNITED STATES PATENTS

| | | | |
|---|---|---|---|
| 2,391,790 | 12/1945 | Martinsson | 137—116 |
| 2,763,336 | 9/1956 | Erikson | 137—108 X |
| 3,069,177 | 12/1962 | Erikson | 277—93 |

WILLIAM F. O'DEA, *Primary Examiner.*

D. J. ZOBKIW, *Assistant Examiner.*